(12) United States Patent
Shimoyama et al.

(10) Patent No.: US 9,067,585 B2
(45) Date of Patent: Jun. 30, 2015

(54) CONTROL DEVICE FOR HYBRID VEHICLE

(71) Applicant: NISSAN MOTOR CO., LTD., Yokohama-shi, Kanagawa (JP)

(72) Inventors: Hiroki Shimoyama, Ebina (JP); Haruhisa Tsuchikawa, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/384,867

(22) PCT Filed: Mar. 12, 2013

(86) PCT No.: PCT/JP2013/056871
§ 371 (c)(1),
(2) Date: Sep. 12, 2014

(87) PCT Pub. No.: WO2013/137278
PCT Pub. Date: Sep. 19, 2013

(65) Prior Publication Data
US 2015/0046006 A1     Feb. 12, 2015

(30) Foreign Application Priority Data
Mar. 15, 2012   (JP) ................................. 2012-058956

(51) Int. Cl.
*B60W 20/00*     (2006.01)
*B60K 6/48*      (2007.10)
*B60W 10/06*     (2006.01)
*B60W 10/08*     (2006.01)
*B60W 40/076*    (2012.01)
*B60L 11/02*     (2006.01)

(52) U.S. Cl.
CPC .................. *B60W 20/00* (2013.01); *B60K 6/48* (2013.01); *B60W 10/06* (2013.01); *B60W 10/08* (2013.01); *Y02T 10/6221* (2013.01); *Y02T 10/6286* (2013.01); *B60L 11/02* (2013.01); *Y02T 10/7077* (2013.01); *B60K 2006/4825* (2013.01); *B60W 2550/142* (2013.01); *B60W 20/40* (2013.01); *Y02T 10/6252* (2013.01); *Y02T 10/70* (2013.01); *B60W 40/076* (2013.01)

(58) Field of Classification Search
None
See application file for complete search history.

(56) References Cited

U.S. PATENT DOCUMENTS

| 5,789,882  | A  | * | 8/1998  | Ibaraki et al. ................. 318/148 |
| 6,234,932  | B1 | * | 5/2001  | Kuroda et al. ..................... 477/3 |
| 6,549,840  | B1 | * | 4/2003  | Mikami et al. .................. 701/69 |
| 8,060,268  | B2 |   | 11/2011 | Hasegawa et al. |

(Continued)

FOREIGN PATENT DOCUMENTS

| JP | 64-052865 U   | 3/1989 |
| JP | 2001-107787 A | 4/2001 |

(Continued)

*Primary Examiner* — Jonathan M Dager
(74) *Attorney, Agent, or Firm* — Foley & Lardner LLP

(57) ABSTRACT

A gradient determination control unit releases the hold of a gradient determination result when a state where a road surface gradient detected by a gradient detection unit is smaller than a gradient release determination threshold value continues for a second predetermined time or longer if a vehicle is determined to be in a traveling state by a traveling state determination unit, and releases the hold of the gradient determination result when the road surface gradient detected by the gradient detection unit becomes smaller than the gradient release determination threshold value if the vehicle is determined to be in a stopped state by the traveling state determination unit.

4 Claims, 16 Drawing Sheets

(56) References Cited

U.S. PATENT DOCUMENTS

| | | | |
|---|---|---|---|
| 8,364,369 B2* | 1/2013 | Dickinson et al. | 701/70 |
| 8,445,792 B2 | 5/2013 | Ito et al. | |
| 8,596,390 B2* | 12/2013 | Soliman et al. | 180/65.21 |
| 8,649,924 B2* | 2/2014 | Imaseki | 701/22 |
| 8,706,378 B2* | 4/2014 | Choby | 701/84 |
| 8,761,980 B2* | 6/2014 | Kimoto | 701/22 |
| 8,781,695 B2* | 7/2014 | Bianco et al. | 701/51 |
| 8,831,811 B2* | 9/2014 | Yamazaki | 701/22 |
| 2005/0228554 A1* | 10/2005 | Yamamoto et al. | 701/22 |
| 2007/0199745 A1* | 8/2007 | Hayashi | 180/65.2 |
| 2007/0272456 A1* | 11/2007 | Shiiba | 180/65.2 |
| 2007/0293994 A1* | 12/2007 | Zerbini et al. | 701/22 |
| 2009/0024262 A1* | 1/2009 | Amamiya | 701/22 |
| 2009/0143950 A1* | 6/2009 | Hasegawa et al. | 701/68 |
| 2009/0298642 A1* | 12/2009 | Choi | 477/4 |
| 2010/0076661 A1* | 3/2010 | Ueoka et al. | 701/84 |
| 2011/0005843 A1 | 1/2011 | Ito et al. | |
| 2011/0071001 A1* | 3/2011 | Yu et al. | 477/203 |
| 2011/0112708 A1* | 5/2011 | Fassnacht | 701/22 |
| 2012/0108387 A1* | 5/2012 | Akebono et al. | 477/12 |
| 2012/0203406 A1* | 8/2012 | Akebono et al. | 701/22 |
| 2013/0178332 A1* | 7/2013 | Kazama et al. | 477/21 |
| 2014/0067240 A1* | 3/2014 | Yu | 701/112 |

FOREIGN PATENT DOCUMENTS

| | | |
|---|---|---|
| JP | 2009-132195 A | 6/2009 |
| JP | 2011-017592 A | 1/2011 |

* cited by examiner

CONTROL DEVICE FOR HYBRID VEHICLE

TECHNICAL FIELD

This invention relates to a control device for a hybrid vehicle using an engine and a motor as drive force sources.

BACKGROUND ART

Hybrid vehicles have been put to practical use which are driven using power of at least one of an engine and a motor and in which a battery can be charged using the motor as an electric generator. There is known a structure for intermittently applying power of an engine and a motor to a drive shaft by frictional engagement elements (clutches) in a hybrid vehicle. A first clutch is interposed between the engine and the motor and a second clutch is interposed between the motor and drive wheels.

JP2009-132195A discloses a control device for a hybrid vehicle, in which a first clutch is released with an engine kept in operation, a motor is set at a rotation speed lower than an engine rotation speed and a second clutch is engaged in a slipping manner if a vehicle load is not lower than a predetermined value, as such a hybrid vehicle.

SUMMARY OF INVENTION

In the technique of JP2009-132195A, the hybrid vehicle is driven by controlling the second clutch in a slipping manner if the vehicle load is large, e.g. if a road surface gradient is large.

In such a control, since the road surface gradient constantly changes during traveling, a hysteresis for gradient is set to prevent the occurrence of hunting at the time of starting and stopping the engine if the engine is started after the gradient is detected.

However, when the gradient is detected, it may not be possible to immediately start the engine depending on a vehicle state. In this case, there is a possibility that the gradient has been already passed when the vehicle state changes and it becomes possible to start the engine. In this state, a behavior in which the engine is immediately stopped after being started occurs due to the aforementioned hysteresis, a delay in control timing or the like, thereby causing problems of not only giving a sense of incongruity to a driver, but also wasting fuel.

The present invention was developed in view of such problems and aims to provide a control device for a hybrid vehicle capable of preventing a sense of incongruity caused by the start and stop of an engine.

One aspect of the present invention includes an engine and a motor as drive sources of a vehicle, a gradient detection unit for detecting a gradient of a road surface, a gradient determination control unit for determining that a road surface is a gradient road and holding a gradient determination result if the engine is in a stopped state and a state where the road surface gradient detected by the gradient detection unit is not smaller than a gradient determination threshold value continues for a first predetermined time or longer, an engine start control unit for starting the engine if the gradient determination result is held by the gradient determination control unit and a start permission condition of the engine is satisfied, and a traveling state determination unit for determining whether the vehicle is in a traveling state or in the stopped state.

The gradient determination control unit releases the hold of the gradient determination result to the effect that the road surface is the gradient road on the condition that a state where the road surface gradient detected by the gradient detection unit is smaller than a gradient release determination threshold value continues for a second predetermined time or longer if the vehicle is determined to be in the traveling state by the traveling state determination unit and, on the other hand, the road surface gradient detected by the gradient detection unit becomes smaller than the gradient release determination threshold value if the vehicle is determined to be in the stopped state by the traveling state determination unit.

An embodiment and advantages of the present invention are described in detail below with reference to the accompanying drawings.

DESCRIPTION OF EMBODIMENTS

Hereinafter, an embodiment of the present invention is described in detail based on the drawings.

Figure 1:
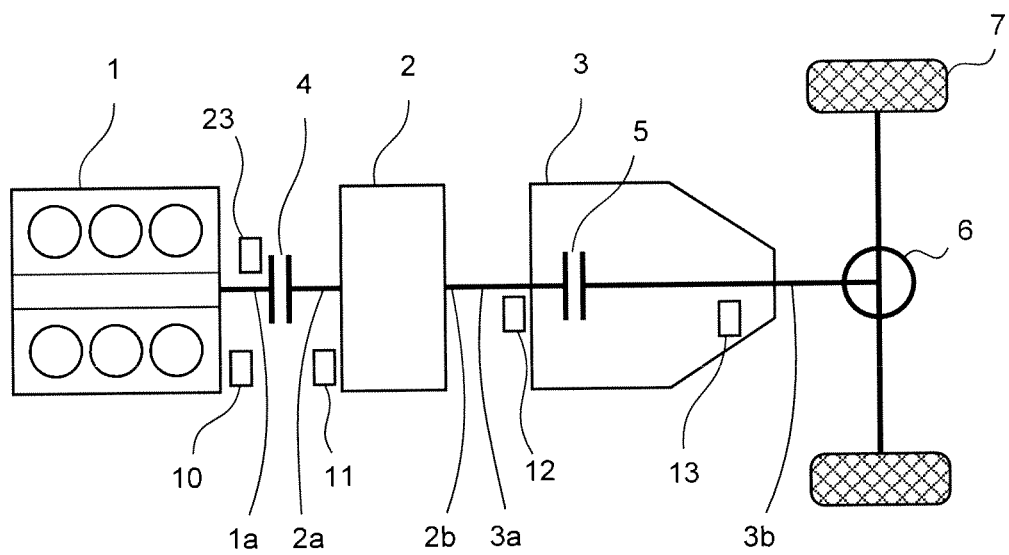
FIG. 1 is a configuration diagram of a power train of a hybrid vehicle of an embodiment of the present invention.
Figure 15:
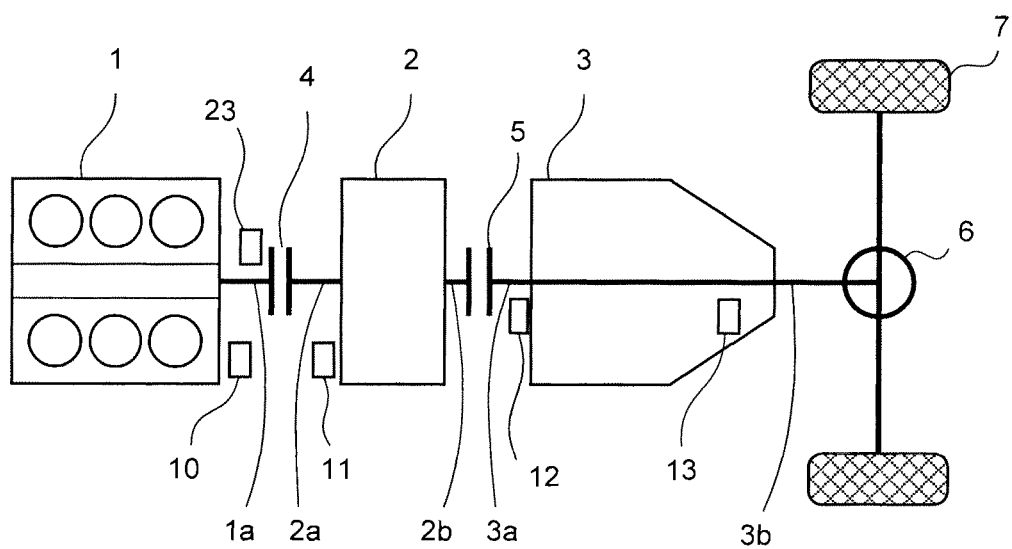
FIG. 15 is a diagram showing a modification of the power train of the hybrid vehicle of the embodiment of the present invention.
Figure 16:
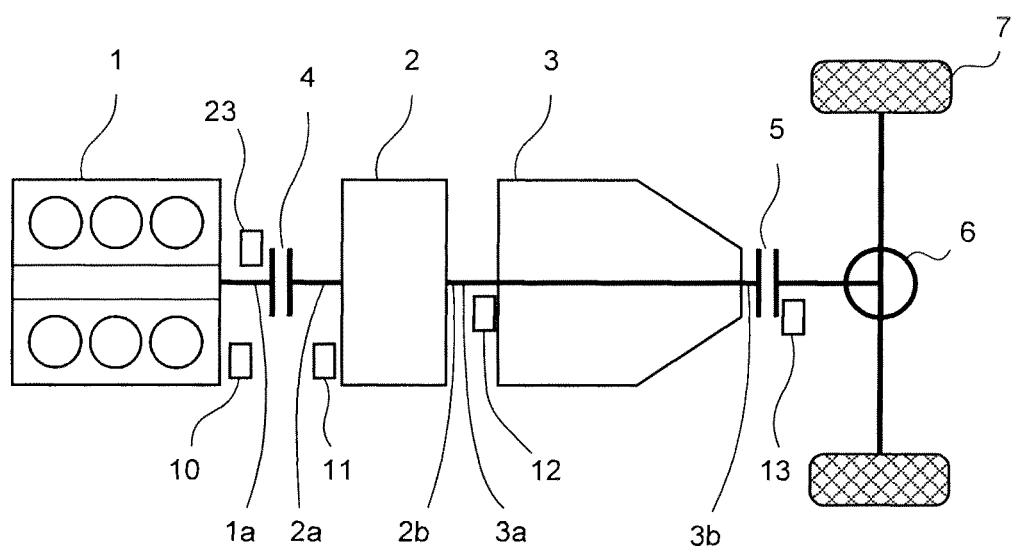
FIG. 16 is a diagram showing a modification of the power train of the hybrid vehicle of the embodiment of the present invention.

FIG. 1 is a configuration diagram of a power train of a hybrid vehicle of the embodiment of the present invention. As shown in FIGS. 15 and 16, the configuration of the power train of the hybrid vehicle, particularly the position of a second clutch 5 is not limited to that shown in FIG. 1.

In the power train of the hybrid vehicle shown in FIG. 1, an engine 1 which is a drive force source as an internal combustion engine and a motor generator 2 for generating a drive force by electric power are arranged in series in a traveling direction of the vehicle. These drive forces are shifted by an automatic transmission 3 and output to drive wheels 7 via a differential gear 6.

The motor generator 2 generates a drive force by acting as a motor and generates electric power by acting as an electric generator.

A crankshaft (output shaft) 1a of the engine 1 and an input shaft 2a of the motor generator 2 are coupled via a first clutch 4. An output shaft 2b of the motor generator 2 is coupled to an input shaft 3a of the automatic transmission 3. The differential gear 6 is connected to an output shaft 3b of the automatic transmission 3.

The automatic transmission 3 selects a transmission path and determines a gear position by a combination of a plurality of frictional engagement elements (clutches, brakes, etc.) by selectively engaging and releasing these frictional engagement elements. Accordingly, the automatic transmission 3 outputs rotation from the input shaft 3a to the output shaft 3b while shifting the rotation to a speed ratio corresponding to the selected gear position.

The automatic transmission 3 uses one of the plurality of frictional engagement elements as the second clutch 5. The automatic transmission 3 combines power of the engine 1 input via the first clutch 4 and power input from the motor generator 2 and outputs the combined power to the drive wheels 7.

The first clutch 4 is, for example, a dry clutch whose engaged state is controlled by a hydraulic pressure. The second clutch 5 is a wet multi-disc clutch whose capacity is controlled by a hydraulic pressure. Both clutches may be dry clutches or wet multi-disc clutches.

The first clutch 4 includes a stroke sensor 23 for detecting a stroke amount of the first clutch 4.

The output shaft 1a of the engine 1 includes an engine rotation speed sensor 10 for detecting a rotation speed Ne of the engine 1. The input shaft 2a of the motor generator 2 includes a motor generator rotation speed sensor 11 for detecting a rotation speed Nm of the motor generator 2.

The automatic transmission 3 includes an automatic transmission input shaft rotation speed sensor 12 for detecting an input shaft rotation speed Ni of the automatic transmission 3 and an automatic transmission output shaft rotation speed sensor 13 for detecting an output shaft rotation speed No of the automatic transmission 3.

A signal from each of these sensors is output to an integrated controller 20 to be described later with reference to FIG. 2.

The power train of the hybrid vehicle configured as described above has three travel modes according to the engaged state of the first clutch 4. A first travel mode is an electric travel mode (hereinafter, referred to as an "EV mode") in which the first clutch 4 is released and the vehicle travels using only power of the motor generator 2.

A second travel mode is a hybrid travel mode (hereinafter, referred to as an "HEV mode") in which the first clutch 4 is engaged and the vehicle travels using power of both the engine 1 and the motor generator 2.

A third travel mode is a slip travel mode (hereinafter, referred to as a "WSC (Wet Start Clutch) mode") in which the first clutch 4 is engaged, the second clutch 5 is controlled in a slipping manner and the vehicle travels using power of the engine 1 and the motor generator 2. In the WSC mode, creep traveling is realized particularly when an SOC of a battery is low or engine water temperature is low. This is a mode in which a drive force can be output while the engine 1 is started at the time of starting the engine 1 in a stopped state.

In the WSC mode, a driver may execute an accelerator hill hold to maintain a vehicle stopped state by adjusting an accelerator pedal when a vehicle load is large (e.g. on an uphill road having a road surface gradient not smaller than a predetermined value). At this time, a state where a slip amount of the second clutch 5 is excessive may be continued in the WSC mode. This is to generate a rotation difference by the slip of the second clutch 5 because the rotation speed of the engine 1 cannot be reduced to be lower than an idle rotation speed.

Accordingly, a motor slip travel mode (hereinafter, abbreviated as a "MWSC mode") is further provided in which the first clutch 4 is released with the engine 1 kept in operation, the second clutch 5 is controlled in a slipping manner while the motor generator 2 is operated and the vehicle travels using the motor generator 2 as a power source in the case of determining an uphill road having a road surface gradient not smaller than the predetermined value.

The above HEV mode includes an "engine travel mode", a "motor assist travel mode" and a "traveling power generation mode".

The engine travel mode is a mode in which the drive wheels 7 are driven using only the engine 1 as a drive source. The motor assist travel mode is a mode in which the vehicle travels using both the engine 1 and the motor generator 2 as drive sources. The traveling power generation mode is a mode in which the motor generator 2 is caused to function as an electric generator by a drive force of the engine 1 at the same time as the vehicle travels using the engine 1 as the drive source.

As another mode, there is a power generation mode in which the motor generator 2 is caused to function as an electric generator by the drive force of the engine 1 when the vehicle is stopped.

Although any of the frictional engagement elements in the automatic transmission 3 is used as the second clutch 5 located between the motor generator 2 an the drive wheels 7 in FIG. 1, the second clutch 5 may be interposed between the motor generator 2 and the automatic transmission 3 as in a modification shown in FIG. 15 or may be interposed between the automatic transmission 3 and the differential gear 6 as in a modification shown in FIG. 16.

The integrated controller 20 switches the above travel modes by controlling the engine 1, the motor generator 2, the first clutch 4, the second clutch 5 and the like.

Figure 2:
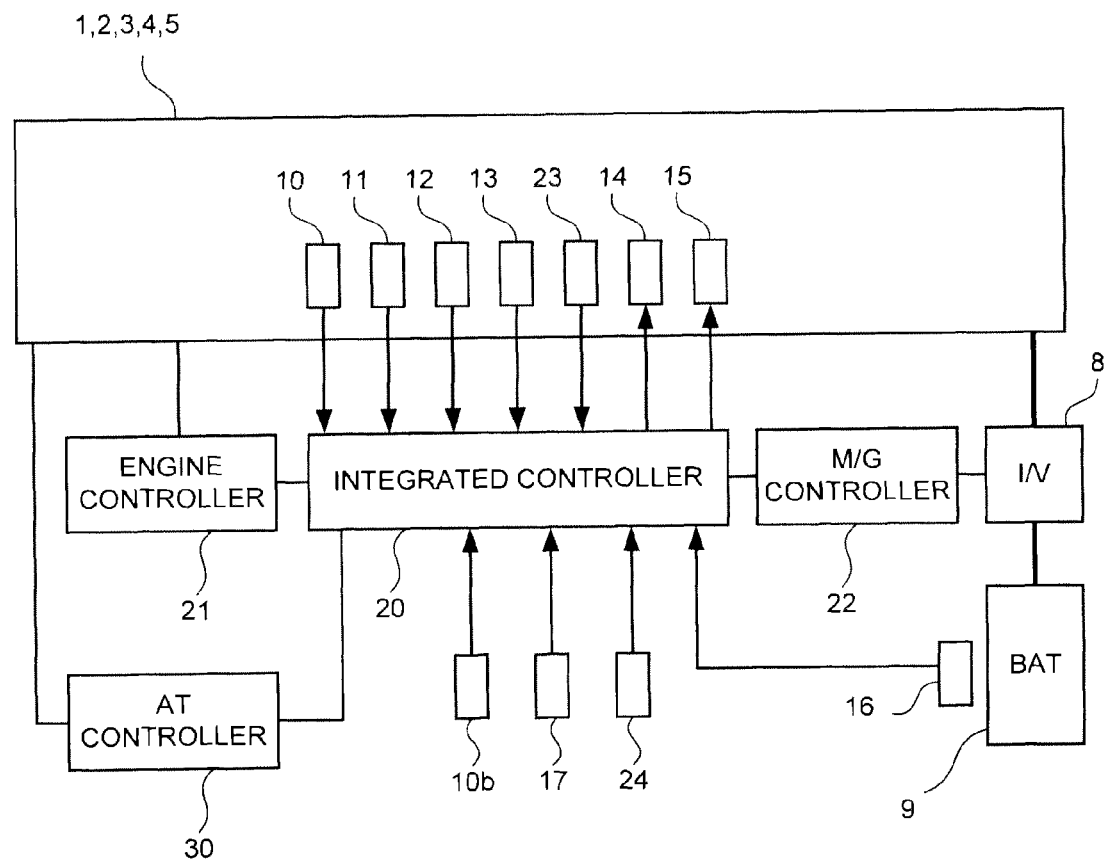
FIG. 2 is a configuration block diagram of a hybrid system including a control device of the embodiment of the present invention.

FIG. 2 is a configuration block diagram of a hybrid system including the integrated controller 20.

The hybrid system is composed of the integrated controller 20, an engine controller 21, a motor generator controller 22, an inverter 8, a battery 9 and the like.

Signals from the engine rotation speed 10, the motor generator rotation speed sensor 11, the automatic transmission input shaft rotation speed sensor 12, the automatic transmission output shaft rotation speed sensor 13 and the stroke sensor 23 are input to the integrated controller 20. Signals from an accelerator pedal opening sensor 17 for detecting an accelerator pedal opening APO (=actual accelerator pedal opening rAPO) and an SOC sensor 16 for detecting a state of charge (SOC) of the battery 9 are input to the integrated controller 20. Signals from a G-sensor 10b for detecting a gradient of a road surface and a brake oil pressure sensor 24 for detecting a brake oil pressure of a brake device are input to the integrated controller 20.

The integrated controller 20 determines an operating point of the power train according to the accelerator pedal opening APO, the battery state of charge SOC and a vehicle speed VSP (proportional to the automatic transmission output shaft rotation speed No) and selects the travel mode in which a drive force desired by a driver can be realized. The integrated controller 20 commands a target motor generator torque or a target motor generator rotation speed to the motor generator controller 22. The integrated controller 20 designates a target engine torque to the engine controller 21. The integrated controller 20 gives a drive signal as a command to each of a solenoid valve 14 for controlling the hydraulic pressure of the first clutch 4 and a solenoid valve 15 for controlling the hydraulic pressure of the second clutch 5.

The engine controller 21 controls the engine 1 so that an engine torque becomes the target engine torque. An AT controller 30 controls the speed ratio of the automatic transmission 30.

The motor generator controller 22 controls the motor generator 2 via the battery 9 and the inverter 8 so that a torque of the motor generator 2 becomes the target motor generator torque (or the rotation speed of the motor generator becomes the target motor generator rotation speed). If the motor generator 2 is used as the electric generator, a power generation torque of the motor generator is controlled so that the motor generator 2 attains a target power generation torque.

The inverter 8 converts power of the battery 9 into a high-frequency current and supplies the high-frequency current to the motor generator 2. When the motor generator 2 is in a power generating state, the generated power is converted into a direct current and charges the battery 9 with the direct current.

Next, a control computed by the integrated controller 20 is described. For example, computation is performed in every control cycle of 10 msec in the integrated controller 20.

Figure 3:
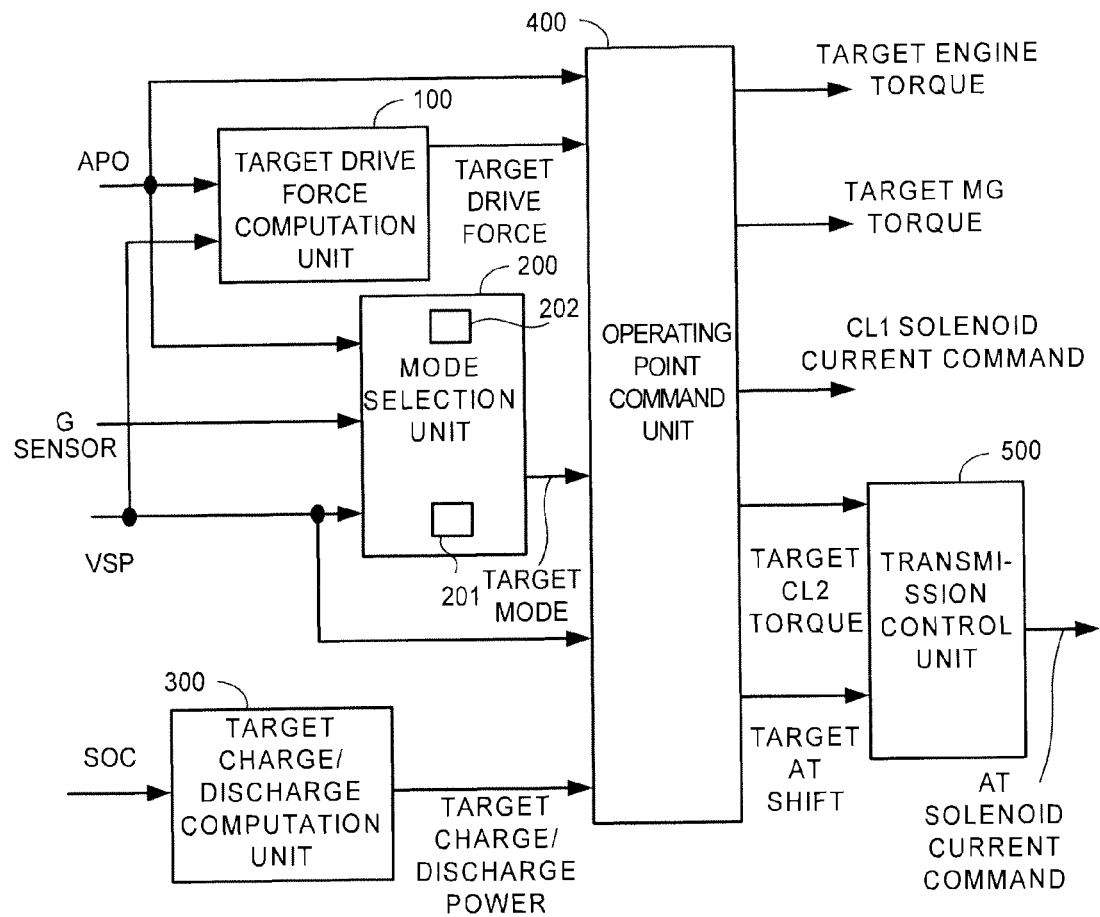
FIG. 3 is a function block diagram of an integrated controller of the embodiment of the present invention.

FIG. 3 is a function block diagram of the integrated controller 20.

The integrated controller 20 includes a target drive force computation unit 100, a mode selection unit 200, a target charge/discharge computation unit 300, an operating point command unit 400 and a transmission control unit 500.

Figure 4:
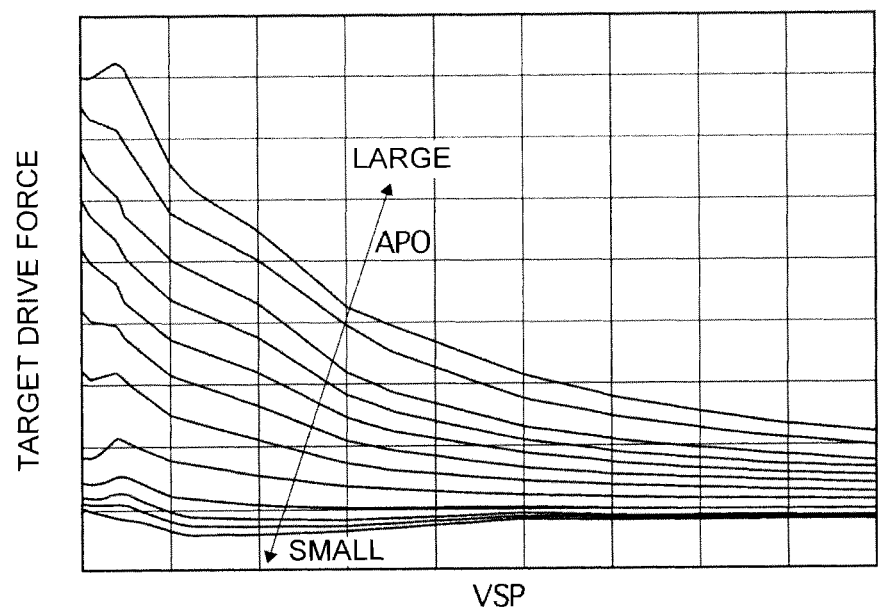
FIG. 4 is a graph showing an example of a target drive force map of the embodiment of the present invention.

The target drive force computation unit 100 computes a target drive force tFo0 from the accelerator pedal opening APO and the vehicle speed VSP using a target drive force map shown in FIG. 4.

The mode selection unit 200 includes a road surface gradient estimation/computation unit 201 for estimating a road surface gradient based on a detection value of the G-sensor 10b. The road surface gradient estimation/computation unit 201 computes an actual acceleration from a wheel speed acceleration average value of a wheel speed sensor 19 and the like and estimates the road surface gradient from a deviation between a computation result and the G-sensor detection value.

The mode selection unit 200 includes a mode map selection unit 202 for selecting either one of two mode maps to be described later based on the estimated road surface gradient.

Figure 5:
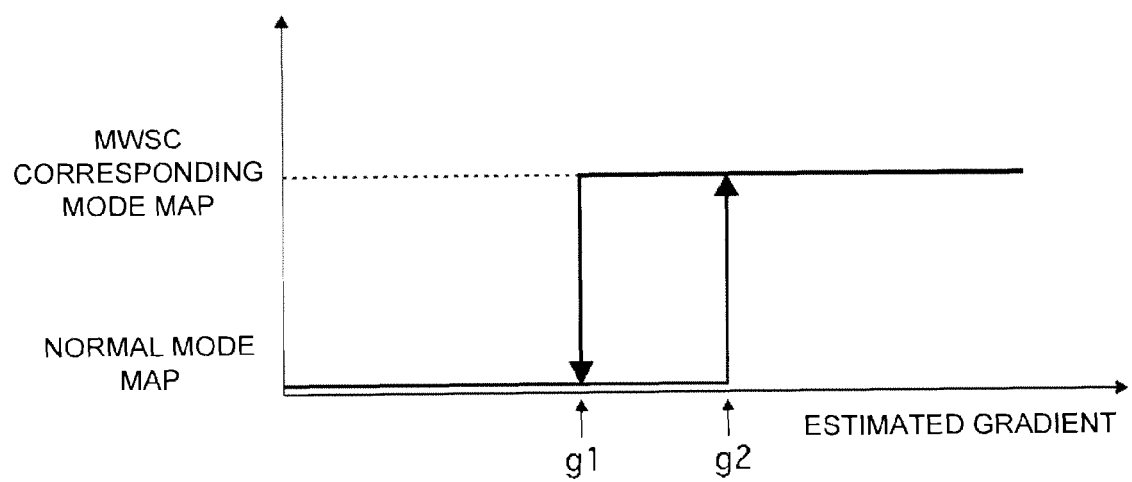
FIG. 5 is a schematic chart showing a selection logic of a mode map selection unit of the embodiment of the present invention.

FIG. 5 is a schematic chart showing a selection logic of the mode map selection unit 202.

The mode map selection unit 202 switches a normal mode map to an MWSC corresponding mode map if the estimated gradient becomes equal to or larger than a predetermined value g2. On the other hand, the MWSC corresponding mode map is switched to the normal mode map if the estimated gradient falls below a predetermined value g1. g1 is set smaller than g2 and a hysteresis is provided for the estimated gradient to prevent control hunting when the map is switched.

Figure 6:
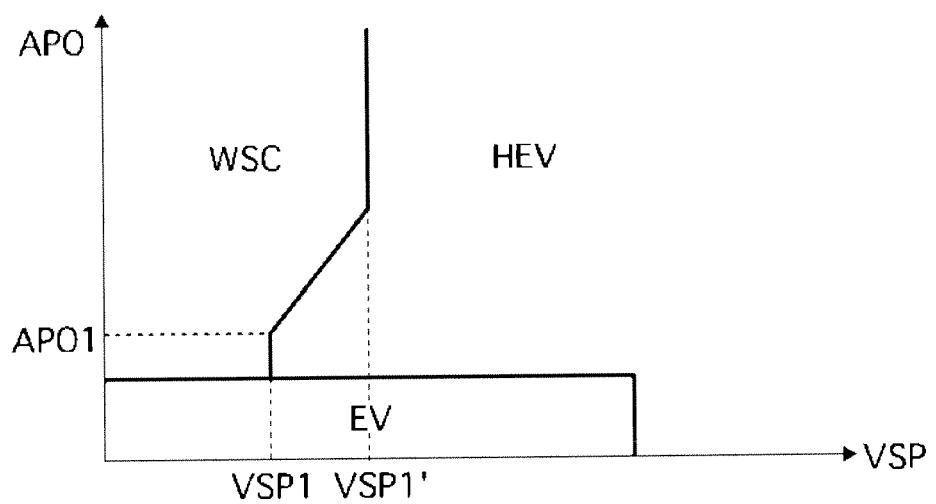
FIG. 6 is a chart showing an example of a normal mode map of the embodiment of the present invention.
Figure 7:
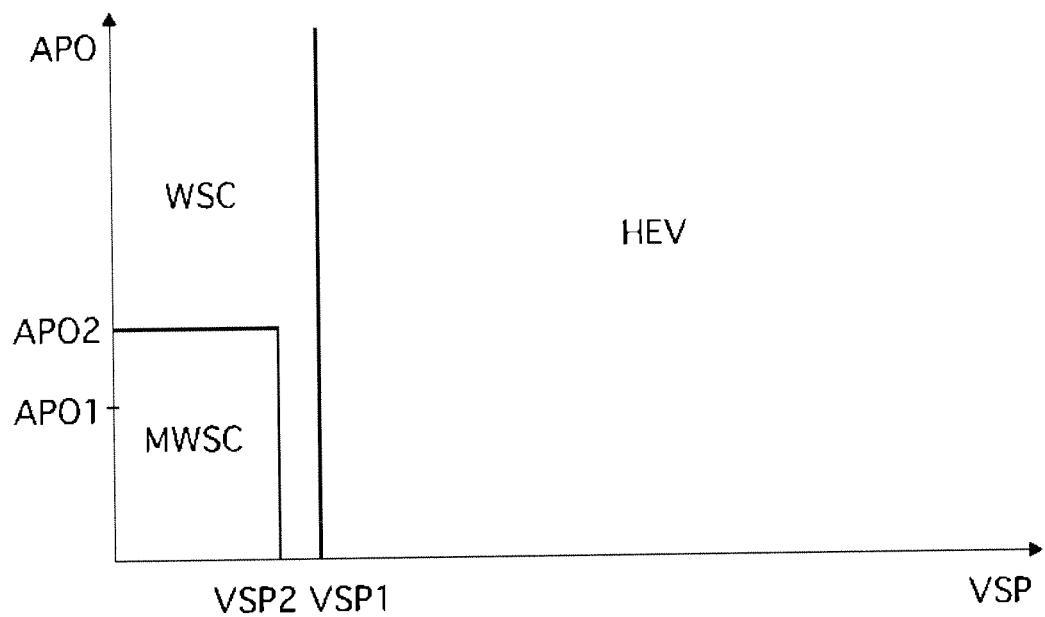
FIG. 7 is a chart showing an example of a MWSC mode map of the embodiment of the present invention.

Next, the mode maps are described. The mode maps include the normal mode map selected when the estimated gradient is smaller than the predetermined value and the MWSC corresponding mode map selected when the estimated gradient is not smaller than the predetermined value. FIG. 6 shows the normal mode map and FIG. 7 shows the MWSC mode map.

The normal mode map includes the EV mode, the WSC mode and HEV mode. The integrated controller 20 computes a target mode from the accelerator pedal opening APO and the vehicle speed VSP based on the normal mode map. If the battery state of charge SOC is not above a predetermined value even if the EV mode is selected, the "HEV mode" is forcibly set as the target mode.

In the normal mode map of FIG. 6, a HEV→WSC switch line is set in a region lower than a lower limit vehicle speed VSP1 which provides a rotation speed lower than the idle rotation speed of the engine 1 when the automatic transmission 3 is in the first gear position in a region below a predetermined accelerator pedal opening APO1.

Since a large drive force is required in a region not below the predetermined accelerator pedal opening APO1, the WSC mode is set in a region up to a vehicle speed VSP1' higher than the lower limit vehicle speed VSP1.

The WSC mode is selected even at the time of start when the battery state of charge SOC is low and the EV mode cannot be achieved.

When the accelerator pedal opening APO is large, it may be difficult to achieve that requirement with the engine torque and the torque of the motor generator 2 corresponding to the engine rotation speed near the idle rotation speed.

Here, more engine torque can be output if the engine rotation speed increases. From this, even if the WSC mode is executed up to the vehicle speed higher than the lower limit vehicle speed VSP1, a transition from the WSC mode to the HEV mode can be made in a short time if the engine rotation speed is increased to output more torque. This is a WSC region expanded to the lower limit vehicle speed VSP1 shown in FIG. 6.

The MWSC mode map of FIG. 7 differs from the normal mode map in that the EV mode region is not set, the WSC mode region is specified only based on the lower limit vehicle speed VSP1 without being changed according to the accelerator pedal opening APO and a MWSC mode region is set in the WSC mode region.

The MWSC mode region is set in a region defined by a predetermined vehicle speed VSP2 lower than the lower limit vehicle speed VSP1 and a predetermined accelerator pedal opening APO2 larger than the predetermined accelerator pedal opening APO1. The MWSC mode is described in detail later.

Figure 8:
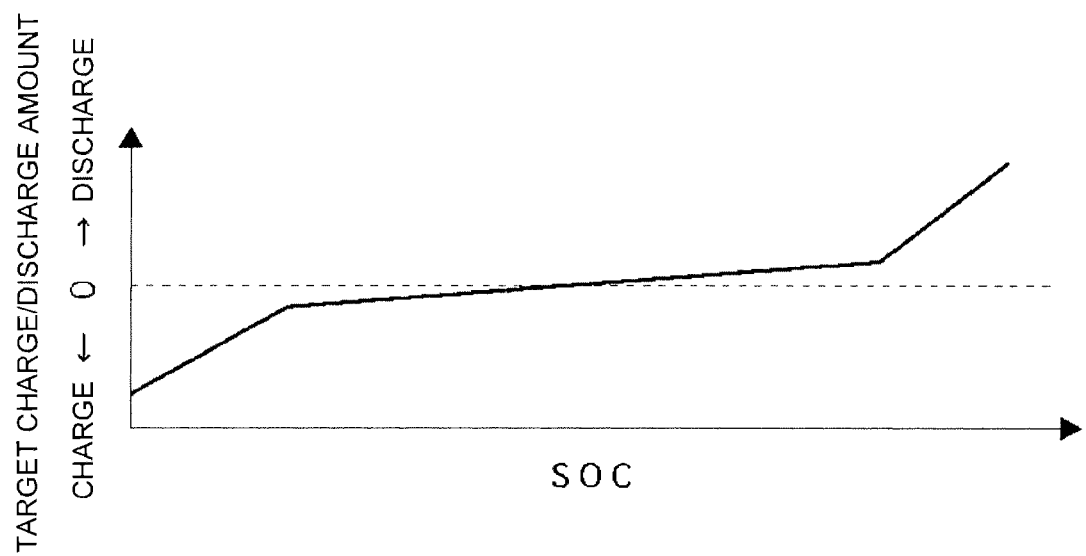
FIG. 8 is a chart showing an example of a target charge/discharge amount map of the embodiment of the present invention.

The target charge/discharge computation unit 300 computes target charge/discharge power tP from the battery state of charge SOC using a target charge/discharge amount map shown in FIG. 8.

The operating point command unit 400 computes transient target engine torque, target motor generator torque, target second clutch transmission torque capacity, target gear position of the automatic transmission 3 and first clutch solenoid current command as operating point achieving targets from the accelerator pedal opening APO, the target drive force tFo0, the target mode, the vehicle speed VSP and the target charge/discharge power tP.

The operating point command unit 400 includes an engine start control unit for starting the engine 1 when a transition is made from the EV mode to the HEV mode.

The transmission control unit 500 outputs a command to the AT controller 30 to achieve the target second clutch transmission torque capacity and the target gear position along a shift schedule shown in a shift map. In the shift map, the target gear position is set in advance based on the vehicle speed VSP and the accelerator pedal opening APO.

Next, the MWSC mode region is described.

A large drive force is required than on a flat road, for example, if it is attempted to keep the vehicle in a stopped state or a slow starting state without operating a brake pedal when the estimated gradient is larger than a predetermined gradient (g1 or g2). This is because it is necessary to resist a load of the vehicle itself.

In such a state, it is also considered to select the EV mode when the battery state of charge SOC is sufficient to avoid heat generation caused by the slip of the second clutch 5. However, when a transition is made from the EV mode region to the WSC mode region, the engine needs to be started and the motor generator 2 outputs a drive torque in a state where a starting torque is ensured, wherefore a drive torque upper limit value is unnecessarily reduced.

Further, if only the torque is output to the motor generator 2 and the motor generator 2 is stopped rotating or rotated at a very low speed in the EV mode, a lock current (phenomenon where a current continues to flow into one element) flows into a switching element of the inverter. The lock current may cause a reduction in durability.

Further, when the automatic transmission 3 is in the first gear position, the rotation speed of the engine 1 itself cannot be reduced below the idle rotation speed in a region lower than the lower limit vehicle speed VSP1 equivalent to the idle rotation speed of the engine 1 (region not above VSP2). At this time, if the WSC mode is selected, the slip amount of the second clutch 5 increases, which may affect the durability of the second clutch 5.

Particularly, on a gradient road, a transmission torque capacity required for the second clutch 5 increases since a larger drive force than on a flat road is required. It is likely to lead to a reduction in the durability of the second clutch 5 to keep a state with a high torque and a large slip amount. Since the vehicle speed also increases at a slower rate, it takes time until a transition is made to the HEV mode and more heat may be generated.

Accordingly, the MWSC mode is set in which the rotation speed of the motor generator 2 is feedback-controlled to a target rotation speed higher than an output rotation speed of the second clutch 5 by a predetermined value while the first clutch 4 is released and the transmission torque capacity of the second clutch 5 is controlled to a drive force required by the driver with the engine 1 kept in operation.

In other words, the MWSC mode is a mode in which the second clutch 5 is controlled in a slipping manner while the rotating state of the motor generator 2 is set at a rotation speed lower than the idle rotation speed of the engine 1. Simultaneously, the engine 1 is switched to a feedback control of setting the idle rotation speed as the target rotation speed. In the WSC mode, the engine rotation speed is maintained by the rotation speed feedback control of the motor generator 2. Contrary to this, if the first clutch 4 is released, the engine rotation speed cannot be controlled to the idle rotation speed by the motor generator 2. Thus, an engine rotation speed feedback control is executed by the engine 1 itself.

Next, a control in the MWSC mode is described.

Figure 9:
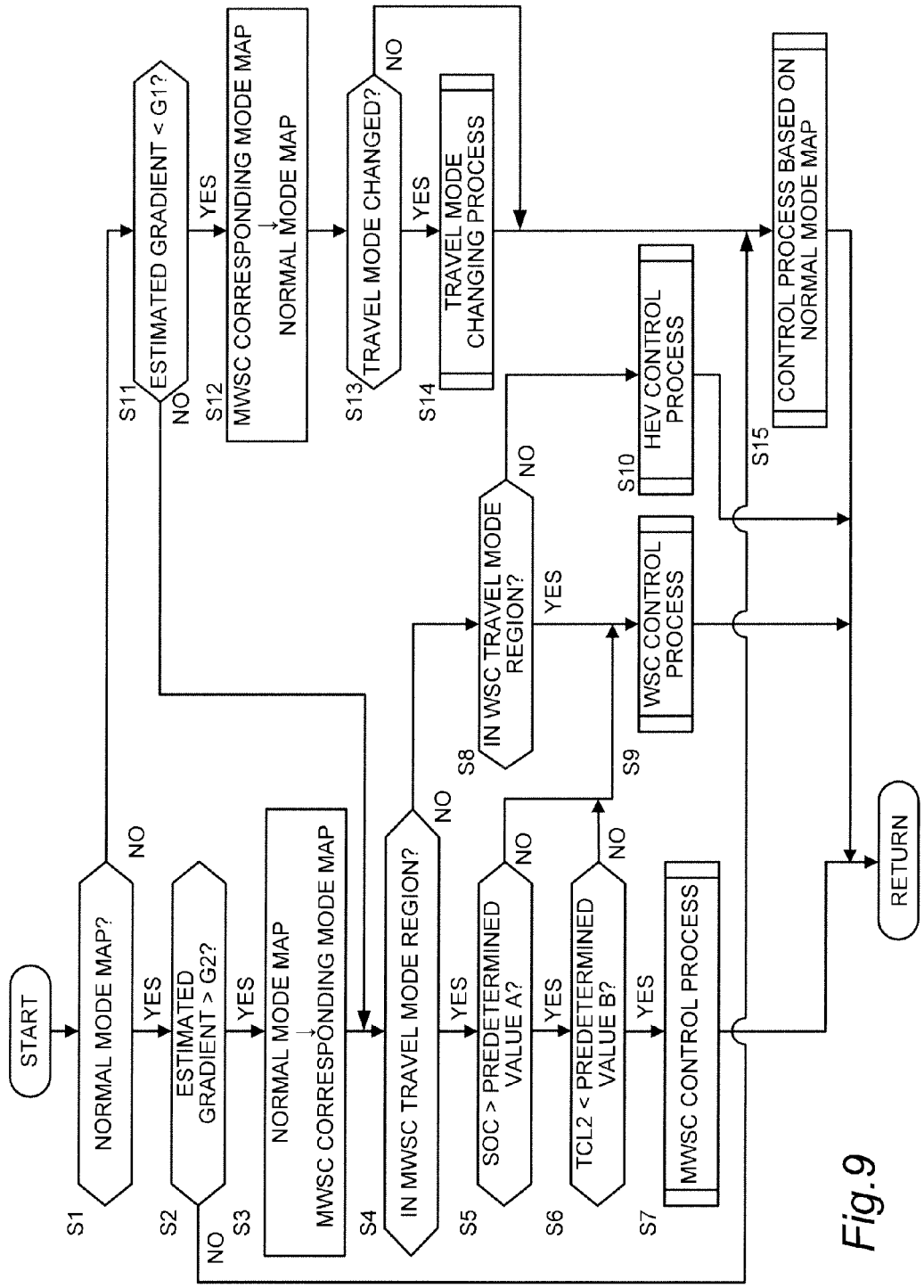
FIG. 9 is a flow chart of a travel control process in an MWSC mode of the embodiment of the present invention.

FIG. 9 is a flow chart of a travel control process in the MWSC mode of the embodiment of the present embodiment. The flow chart shown in FIG. 9 is executed in a predetermined cycle (e.g. every 10 ms) by the integrated controller 20.

In Step S1, the integrated controller 20 determines whether or not the normal mode map is selected and proceeds to Step S2 if the normal mode map is selected while proceeding to Step S11 if the MWSC corresponding mode map is selected.

In Step S2, the integrated controller 20 determines whether or not an estimated gradient is larger than the predetermined value g2 and proceeds to Step S3 if the estimated gradient is larger than the predetermined value g2 while proceeding to Step S15 to perform a control process based on the normal mode map unless otherwise. The predetermined value g2 is a gradient determination threshold value for determining whether or not the current road surface is in a gradient state. For example, the predetermined value g2 is set at 8% and a gradient is determined if the estimated gradient is larger than the predetermined value. A processing of Step S2 is described in detail later.

In Step S3, the integrated controller 20 switches the normal mode map to the MWSC corresponding mode map.

In Step S4, the integrated controller 20 determines whether or not an operating point determined by the current accelerator pedal opening APO and vehicle speed VSP is in the MWSC mode region and proceeds to Step S5 if the operating point is determined to be in this region while proceeding to Step S8 unless otherwise.

In Step S5, the integrated controller 20 determines whether or not the battery state of charge SOC is larger than a predetermined value A and proceeds to Step S6 if the battery state of charge SOC is larger than the predetermined value A while proceeding to Step S9 unless otherwise.

The predetermined value A is a threshold value for determining whether or not the drive force can be ensured only by the motor generator 2. If SOC is larger than the predetermined value A, the drive force can be ensured only by the motor generator 2. However, if SOC is not larger than the predetermined value A, the battery 9 needs to be charged, wherefore the selection of the MWSC mode is prohibited.

In Step S6, the integrated controller 20 determines whether or not a transmission torque capacity TCL2 of the second clutch 5 is below a predetermined value B and proceeds to Step S7 if the transmission torque capacity TCL2 of the second clutch 5 is below the predetermined value B while proceeding to Step S9 unless otherwise.

The predetermined value B is a predetermined value indicating that an excessive current does not flow into the motor generator 2. Since a rotation speed control is executed for the motor generator 2, a torque generated in the motor generator 2 is not smaller than a load acting on the motor generator 2.

In other words, since the rotation speed control is executed for the motor generator 2 to attain a slip state of the second clutch 5, a torque larger than the second clutch transmission torque capacity TCL2 is generated in the motor generator 2.

Thus, if the transmission torque capacity TCL2 of the second clutch 5 is excessive, the current flowing into the motor generator 2 becomes excessive, thereby deteriorating the durability of a switching element and the like. To avoid this state, the selection of the MWSC mode is prohibited when the transmission torque capacity TCL2 is not smaller than the predetermined value B.

In Step S7, the integrated controller 20 performs an MWSC control process. Specifically, if the engine 1 is stopped, the engine 1 is started and the first clutch 4 is released with the engine 1 kept in an operating state.

At this time, the integrated controller 20 executes a feedback control so that the engine 1 attains the idle rotation speed. The motor generator 2 executes such a feedback control of attaining a target rotation speed (value lower than the idle rotation speed) obtained by adding a predetermined rotation speed α to an output side rotation speed NcI2out of the second clutch 5. The second clutch 5 is feedback-controlled to attain a transmission torque capacity corresponding to a required drive force.

Since the MWSC mode is not set in the normal mode map, a mode transition process from the EV mode or the WSC mode is included in the MWSC control process in Step S7. In the case of a transition from the EV mode to the MWSC mode, the engine 1 is started.

In Step S8, the integrated controller 20 determines whether or not the operating point determined by the current accelerator pedal opening APO and vehicle speed VSP is in the WSC mode region and proceeds to Step S9 if the operating point is determined to be in this region while determining that the operating point is in the HEV mode region and proceeding to Step S10 unless otherwise.

In Step S9, the integrated controller 20 executes a WSC control process. Specifically, the first clutch 4 is completely engaged and the engine 1 is feedforward-controlled according to the target torque. The motor generator 2 is feedback-controlled to attain the idle rotation speed. The second clutch 5 is feedback-controlled to attain the transmission torque capacity corresponding to the required drive force.

Since the EV mode is not set in the MWSC corresponding mode map, a mode transition process from the EV mode is included in the WSC control process in Step S9.

In Step S10, the integrated controller 20 executes an HEV control process. Specifically, the first clutch 4 is completely engaged, the engine 1 and the motor generator 2 are feedforward-controlled to attain a torque corresponding to the required drive force and the second clutch 5 is completely engaged. Since the EV mode is not set in the MWSC corresponding mode map, a mode transition process from the EV mode is included in the HEV control process in Step S10.

In Step S11, the integrated controller 20 determines whether or not the estimated gradient is smaller than a gradient release determination threshold value g1 and proceeds to Step S12 if the estimated gradient is smaller than g1 while proceeding to Step S4 to continue the control by the MWSC corresponding mode map unless otherwise. The gradient release determination threshold value g1 is a value for setting a hysteresis for the gradient determination threshold value g2. For example, the gradient release determination threshold value g1 is set at 5% obtained by subtracting a hysteresis amount from the gradient determination threshold value g2 and the gradient is determined to be released if the estimated gradient falls below a predetermined value. Step S11 is described in detail later.

In Step S12, the integrated controller 20 switches the MWSC corresponding mode map to the normal mode map.

In Step S13, the integrated controller 20 determines whether or not the travel mode has been changed in association with a map change and proceeds to Step S14 if the travel mode is determined to have been changed while proceeding to Step S15 unless otherwise. This is because a transition from the MWSC mode to the WSC mode, that from the WSC mode to the EV mode and that from the HEV mode to the EV mode might be made if the MWSC corresponding mode map is switched to the normal mode map.

In Step S14, the integrated controller 20 performs a travel mode changing process. Specifically, at the time of the transition from the MWSC mode to the WSC mode, the target rotation speed of the motor generator 2 is changed to the idle rotation speed and the first clutch 4 is engaged when synchronization is reached. Then, an engine control is switched from an idle rotation speed feedback control to a target engine torque feedforward control.

At the time of the transition from the WSC mode to the EV mode, the integrated controller 20 releases the first clutch 4, stops the engine 1, switches the control of the motor generator 2 from the rotation speed control to a torque control based on the required drive force, and switches the control of the second clutch 5 from the feedback control based on the required drive force to complete engagement.

At the time of the transition from the HEV mode to the EV mode, the integrated controller 20 releases the first clutch 4, stops the engine 1, continues the torque control based on the required drive force for the motor generator 2 and switches the control of the second clutch 5 from the feedback control based on the required drive force to complete engagement.

In Step S15, the integrated controller 20 performs a control process based on the normal mode map.

By such a control, the gradient is determined and the MWSC mode is selected if the estimated gradient is larger than the predetermined value g2 as the gradient determination threshold value. If the estimated gradient is smaller than the gradient release determination threshold value g1 obtained by setting the hysteresis for the predetermined value g2 as the gradient determination threshold value, the gradient determination is released, the MWSC mode is released and the control based on the normal mode map is executed.

Next, the start of the engine 1 is described.

In the aforementioned flow chart of FIG. 9, the MWSC mode is selected if the estimated gradient is larger than the predetermined value g2. At this time, the engine 1 is started, for example, when a transition is made from the EV mode to the MWSC mode in the MWSC control process of Step S7. In other words, the engine 1 is started if the estimated gradient is larger than the predetermined value g2.

At this time, if the engine 1 is started when the torque is output by the motor generator 2, vibration and abnormal noise are generated to give a sense of incongruity to a driver. Accordingly, to prevent this, the integrated controller 20 executes a control to start the engine when the following condition is satisfied.

Figure 10:
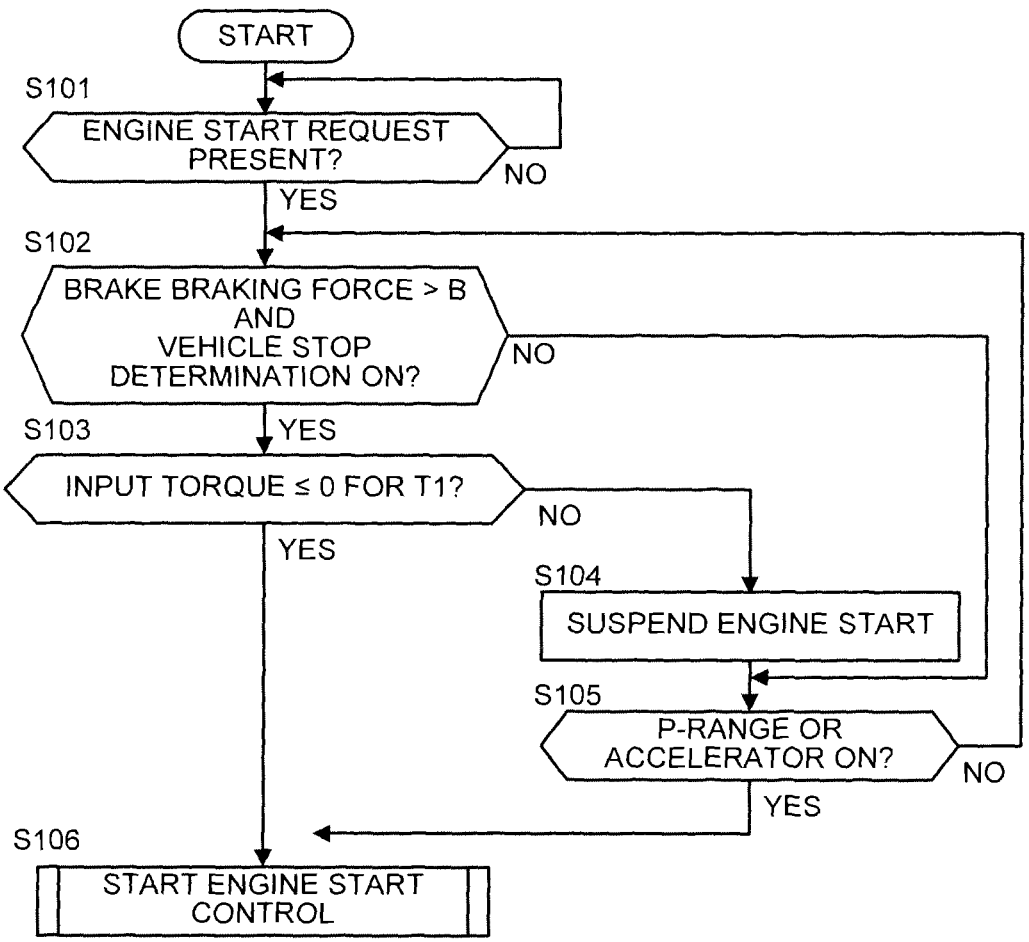
FIG. 10 is a flow chart showing an engine start control of the embodiment of the present invention.

FIG. 10 is a flow chart showing an engine start control of the embodiment of the present invention. The flow chart shown in FIG. 10 is executed in a predetermined cycle (e.g. every 10 ms) by the integrated controller 20.

In Step S101, the integrated controller 20 determines whether or not there is an engine start request and proceeds to Step S102 in the presence of the engine start request while repeating this Step unless otherwise. In the embodiment of the present invention, a request to start the engine 1 is made on the condition that the estimated gradient is larger than the predetermined value g2 in Step S3 of FIG. 9 described above and the gradient determination is made.

In Step S102, the integrated controller 20 determines based on a signal from the brake oil pressure sensor 24 whether or not a brake braking force is larger than a predetermined braking force B and vehicle stop determination is ON. Step S103 follows if this condition holds while Step S105 follows unless otherwise.

The vehicle stop determination means to determine that a vehicle stopped state is nearly reached if a state where the vehicle speed VSP is not above a predetermined value continues for a predetermined time or longer. The vehicle is not necessarily completely stopped.

If it is determined that the vehicle stop determination is ON, the integrated controller 20 controls to gradually reduce a creep torque of the motor generator 2 toward 0 Nm. This is because it is thought that the driver has an intention to brake and a torque variation acting on the wheels can be suppressed to a certain extent if the brake braking force is larger than the predetermined braking force B.

In Step S103, the integrated controller 20 determines whether or not a state where the absolute value of an input torque (i.e. output torque of the motor generator 2) is not above 0 has continued for a specified time T1 or longer. Step S106 follows if this condition is determined to hold while Step S104 follows unless otherwise.

This is because the application of the creep torque is thought to have been completely finished and a torque variation associated with engine start can be suppressed if the state where the absolute value of the input torque is not above 0 continues for the specified time T1 or longer.

Although the input torque is determined using a command torque to the motor generator 2, the torque may be estimated based on the value of a current supplied to the motor generator 2 or the like. Alternatively, the input torque may be detected using a torque sensor or the like.

In Step S104, the integrated controller 20 suspends the engine start. By this, it can be avoided that a sense of incongruity is given to the driver by avoiding the engine start if there is a possibility of an output torque variation of the motor generator 2.

In Step S105, the integrated controller 20 determines whether or not a range position is a P-range position or the accelerator pedal is ON. Step S106 follows if these conditions hold while a return is made to Step S102 unless otherwise.

If the range position is the P-range position, the wheels are forcibly fixed by the actuation of a parking lock mechanism, wherefore the influence of a torque variation can be suppressed even if there is any input torque. If the accelerator pedal is ON, it is proper to immediately start the engine 1 since the driver has an intention to start.

In Step S106, the integrated controller 20 starts an engine start control process. The engine 1 is started by this.

Even if a request to start the engine 1 is issued in accordance with the flow chart shown in FIG. 10, the integrated controller 20 suspends the engine start if the motor generator 2 is outputting the torque. This can prevent a sense of incongruity from being given to the driver due to vibration caused by a torque variation. Specifically, an engine start control unit for starting the engine is configured by the integrated controller 20 when the engine start condition based on the torque of the motor generator 2, the range position or the state of the accelerator pedal is satisfied.

The following problem may occur in the hybrid vehicle in which such a control is executed.

The integrated controller 20 issues a request to start the engine 1 when the estimated gradient is determined to be larger than the predetermined value g2 and the MWSC mode is selected in the flow chart shown in FIG. 9 described above. At this time, the engine start control in accordance with the aforementioned flow chart shown in FIG. 10 is executed. The integrated controller 20 executes a so-called idle stop for the purpose of suppressing fuel consumption when the vehicle decelerates to enter a coast state where the accelerator pedal opening APO is small or when the vehicle is stopped. The engine 1 is stopped by this.

In this control, there are cases where the engine 1 cannot be immediately started when the integrated controller 20 determines that the road surface gradient is larger than the predetermined value g2 and a transition is made to the MWSC mode such as when the output torque of the motor generator 2 is not 0 Nm.

In such a case, the start of the engine 1 is started due to the influence of the hysteresis when the vehicle stops after passing a gradient part of the road surface. However, if the road surface gradient when the vehicle stops is smaller than the gradient release determination threshold value g1, the MWSC mode may be finished and the engine may be immediately stopped.

This means that the engine 1 is successively started and stopped in a short time, and a sense of incongruity is given to the driver due to vibration, abnormal noise and the like.

Accordingly, in the embodiment of the present invention, such a sense of incongruity is prevented by executing the following control.

Figure 11:
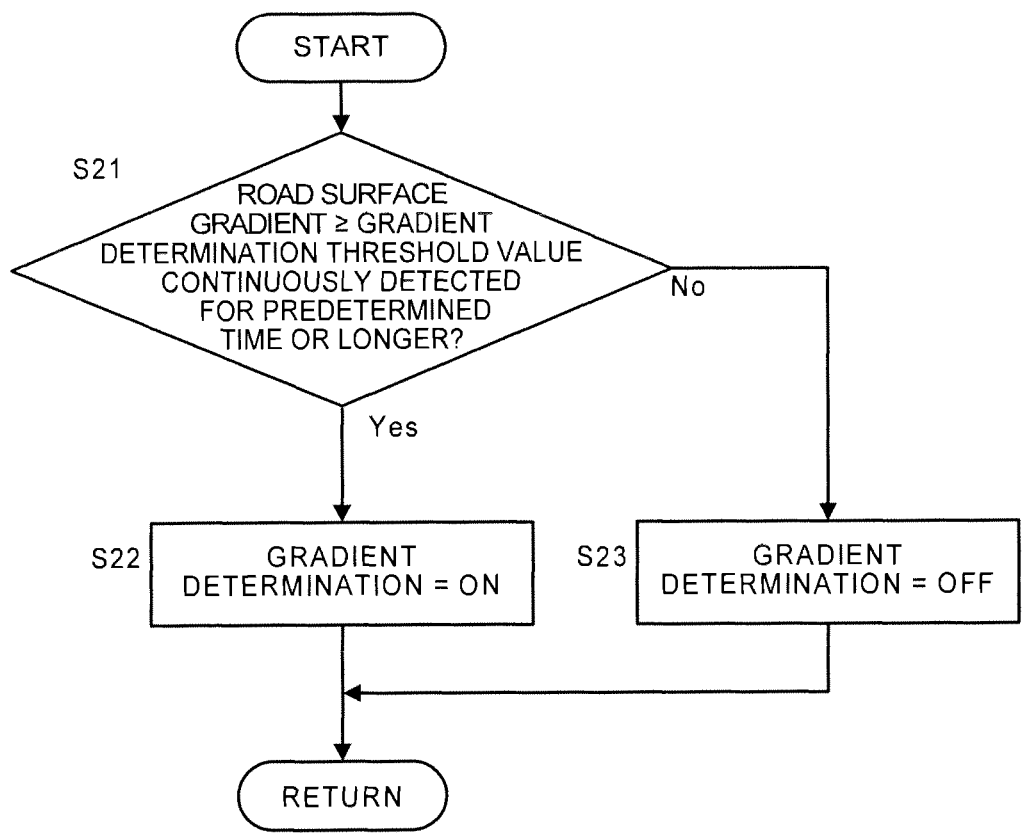
FIG. 11 is a flow chart of a gradient determination process of the embodiment of the present invention.

FIG. 11 is a flow chart of a gradient determination process of the embodiment of the present invention. The flow chart shown in FIG. 11 corresponds to Step S2 of the flow chart of FIG. 9.

In Step S2 of FIG. 9, the integrated controller 20 determines whether or not the estimated gradient is larger than the predetermined value g2 and proceeds to Step S3 to transition to the MWSC mode if the estimated gradient is larger than the predetermined value g2.

At this time, as shown in Step S21 of FIG. 11, the integrated controller 20 determines whether or not a state where the estimated gradient of the current road surface is larger than the predetermined value g2 as the gradient determination threshold value has been continuously detected for a first predetermined time or longer. The first predetermined time is a continuous time provided to eliminate noise included in the detection value of the G-sensor 10b and an influence caused by vibration, sway and the like of the traveling vehicle and set, for example, at 1 sec.

If it is determined that the state where the estimated gradient is larger than the predetermined value g2 has been continuously detected for the first predetermined time or longer, a transfer is made to Step 21 and the integrated controller 20 determines the presence of the gradient state and holds the gradient state determination result. Specifically, the determination of Step S2 in FIG. 9 becomes affirmative.

Unless the state where the estimated gradient is larger than the predetermined value g2 has been continuously detected for the first predetermined time or longer, a transfer is made to Step 22 and the integrated controller 20 determines the absence of the gradient. Specifically, the determination of Step S2 in FIG. 9 becomes negative.

The integrated controller 20 determines the presence of the gradient state in this way, whereby the gradient determination control unit is configured.

Figure 12:
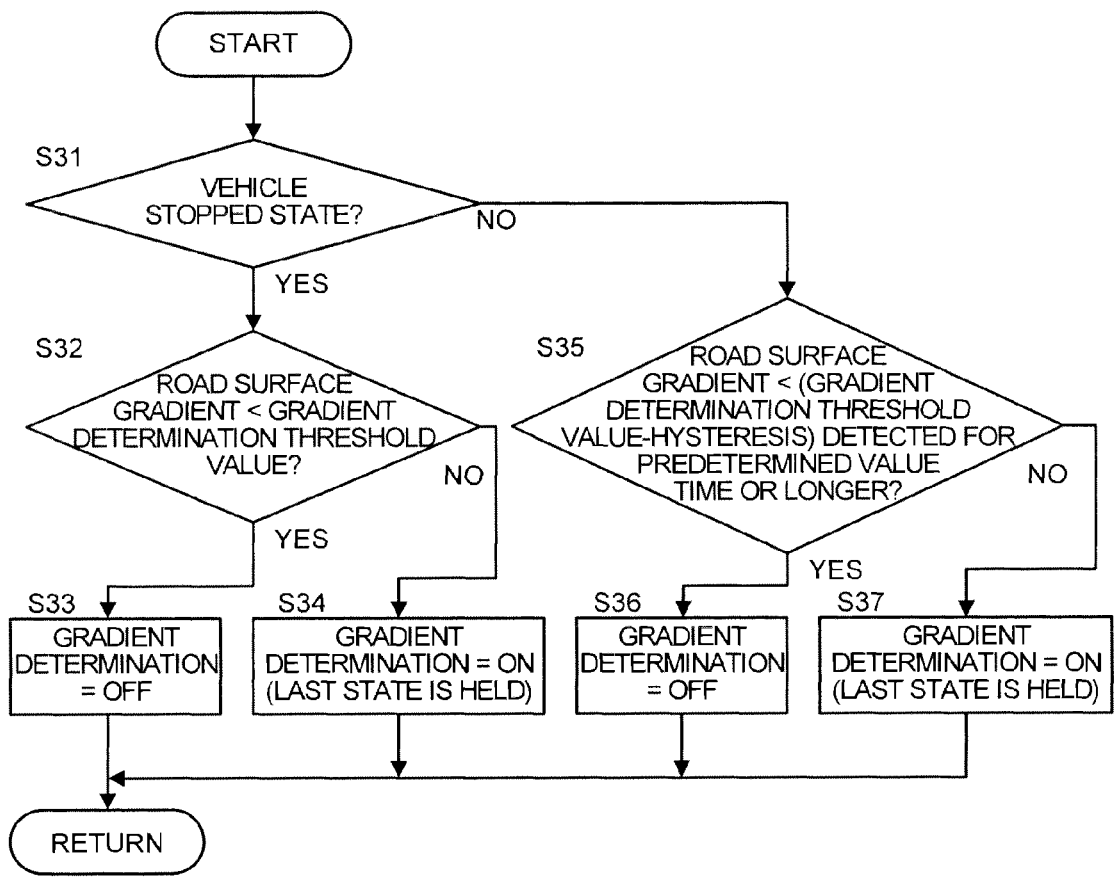
FIG. 12 is a flow chart of a gradient release determination process of the embodiment of the present invention.

FIG. 12 is a flow chart of a gradient release determination process of the embodiment of the present invention. The flow chart shown in FIG. 12 corresponds to the process of Step S11 of the flow chart of FIG. 9.

In Step S11 of FIG. 9, the integrated controller 20 determines whether or not the estimated gradient is smaller than the gradient release determination threshold value g1 and proceeds to Step S12 to release the MWSC mode and transition to the travel mode using the normal mode map if the estimated gradient is smaller than the gradient release determination threshold value g1.

In the present embodiment, the release of the MWSC mode is further controlled by the following condition.

Specifically, in the flow chart of FIG. 12, the integrated controller 20 first determines whether or not the hybrid vehicle is stopped in Step S31. A transfer is made to Step S32 if the vehicle is determined to be stopped while being made to Step S35 if the vehicle is not determined to be stopped. In the determination of Step S31, the vehicle is determined to be stopped, for example, if the vehicle speed VSP is 0 or below several km/h. The integrated controller determines whether the vehicle is in the traveling state or in the stopped state based on the vehicle speed VSP in this way, whereby a traveling state determination unit is configured.

Subsequently, in Step S32, the integrated controller 20 determines whether or not the estimated gradient of the current road surface is smaller than the predetermined value g2 as the gradient determination threshold value.

A transfer is made to Step S33 and the integrated controller 20 determines the absence of the gradient if the road surface gradient is determined to be smaller than the gradient determination threshold value (if the gradient determination result is held, this is released). Specifically, the determination of Step S11 in FIG. 9 becomes affirmative.

A transfer is made to Step S34 and the integrated controller 20 determines the presence of the gradient (gradient determination result determined last time is held) if the road surface gradient is determined to be larger than the gradient determination threshold value. Specifically, the determination of Step S11 in FIG. 9 becomes negative.

Processings of Steps S32 to S34 are performed to immediately release the result on the determination of the gradient if the determined gradient is smaller than the threshold value when the vehicle is stopped. This is because there is no problem even if the gradient determination is immediately released by comparing the estimated gradient and the predetermined value g2 including no set hysteresis since the value of each sensor used to detect the gradient has little error and noise when the vehicle is stopped.

If the vehicle is determined to be traveling in Step S31, a transfer is made to Step S35 and the integrated controller 20 compares the estimated gradient with the gradient release determination threshold value g1 obtained by setting the hysteresis for the gradient determination threshold value g2. Then, whether or not a state where the estimated gradient is smaller than the gradient release determination threshold value g1 has been continuously detected for a second predetermined time or longer is determined. Similarly to the first predetermined time, the second predetermined time is also a continuous time provided to eliminate noise included in the detection value of the G-sensor 10b and an influence caused by vibration, sway and the like of the traveling vehicle and set, for example, at 1 sec.

If the state where the estimated gradient is smaller than the gradient release determination threshold value g1 has been continuously detected for the second predetermined time or longer, a transfer is made to Step S36 and the integrated controller 20 determines the absence of the gradient (if the gradient determination result is held, this is released). Specifically, the determination of Step S11 in FIG. 9 becomes affirmative.

Unless the state where the estimated gradient is smaller than the gradient release determination threshold value g1 has been continuously detected for the second predetermined time or longer, a transfer is made to Step S37 and the integrated controller 20 holds the gradient determination result determined last time, assuming that the gradient is continuously detected. Specifically, the determination of Step S11 in FIG. 9 becomes negative.

By executing the control as in the flow chart shown in FIG. 12, the gradient determination can be immediately released when the gradient becomes smaller than the predetermined value without monitoring by the hysteresis and timer time particularly in the stopped state of the vehicle. This can suppress the start of the engine, for example, in such a road surface state where the road surface gradient disappears simultaneously with the stop of the vehicle when the vehicle stops after the gradient determination. This can prevent a sense of incongruity from being given to the driver by the engine start and suppress fuel consumption. The integrated controller provides the gradient determination result to the effect that the road surface is in the gradient state and holds this result or release the hold of the gradient determination result, whereby the gradient determination control unit is configured.

Figure 13:
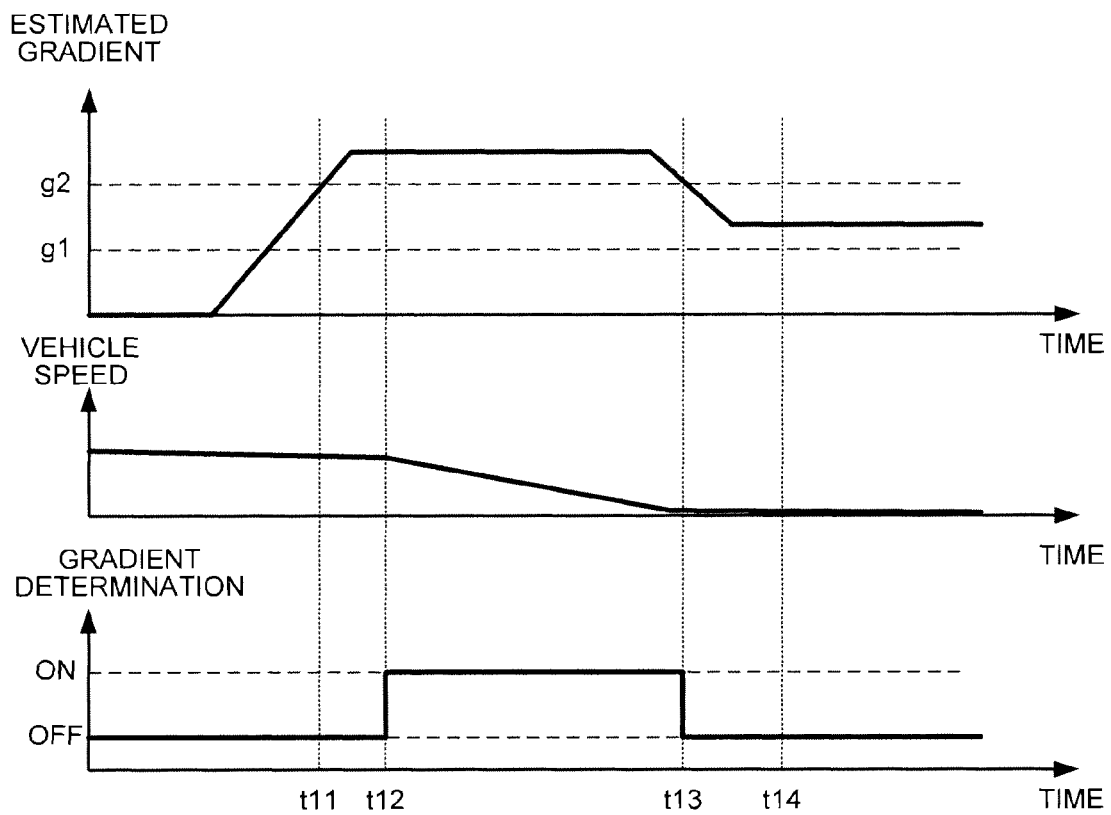
FIG. 13 is charts showing a control when a vehicle stops according to the embodiment of the present invention.

FIG. 13 is charts showing the control when the vehicle stops in the embodiment of the present invention.

In FIG. 13, the estimated gradient, the vehicle speed and the gradient determination state are respectively shown in the form of time charts from top with a horizontal axis representing time.

FIG. 13 shows a driving state where the vehicle decelerates and stops at timing t13. In the shown state, the road surface gradient at this time increases as the vehicle travels and, after exceeding the predetermined value g2, the estimated gradient is located in a range between g1 and g2 (hysteresis range) substantially at the same time as the vehicle stops.

First, the estimated gradient gradually increases as the vehicle travels and becomes equal to or larger than the predetermined value g2 at timing t11. If this state continues for the first predetermined time (timing t12), the determination becomes affirmative in Step S21 of FIG. 11 described above and the gradient is determined.

Thereafter, the vehicle decelerates, the vehicle speed becomes substantially 0 km/h at timing t13 and the vehicle is stopped. It is assumed that the estimated gradient becomes the gradient between the gradient release determination threshold value g1 and the predetermined value g2 before or after timing t13.

In accordance with Step S11 of FIG. 9 described above, the gradient determination is not released if the estimated gradient is not smaller than the gradient release determination threshold value g1. If the vehicle starts traveling again in this situation, a transition is made to the MWSC mode to start the engine 1, for example, if idling stop is executed since the gradient determination is kept. At this time, the gradient determination is released and the engine 1 is immediately stopped if the estimated gradient becomes equal to or smaller than the gradient release determination threshold value g1 immediately after the vehicle is restarted.

To prevent this, in the present invention, the determination in Step S21 of FIG. 11 becomes negative and the gradient determination is released if the vehicle is stopped and the estimated gradient is smaller than the predetermined value g2 including no hysteresis at timing t13. This prevents the engine 1 from being stopped after the start without a transition to the MWSC mode since the gradient determination is released when the vehicle is restarted.

Figure 14:
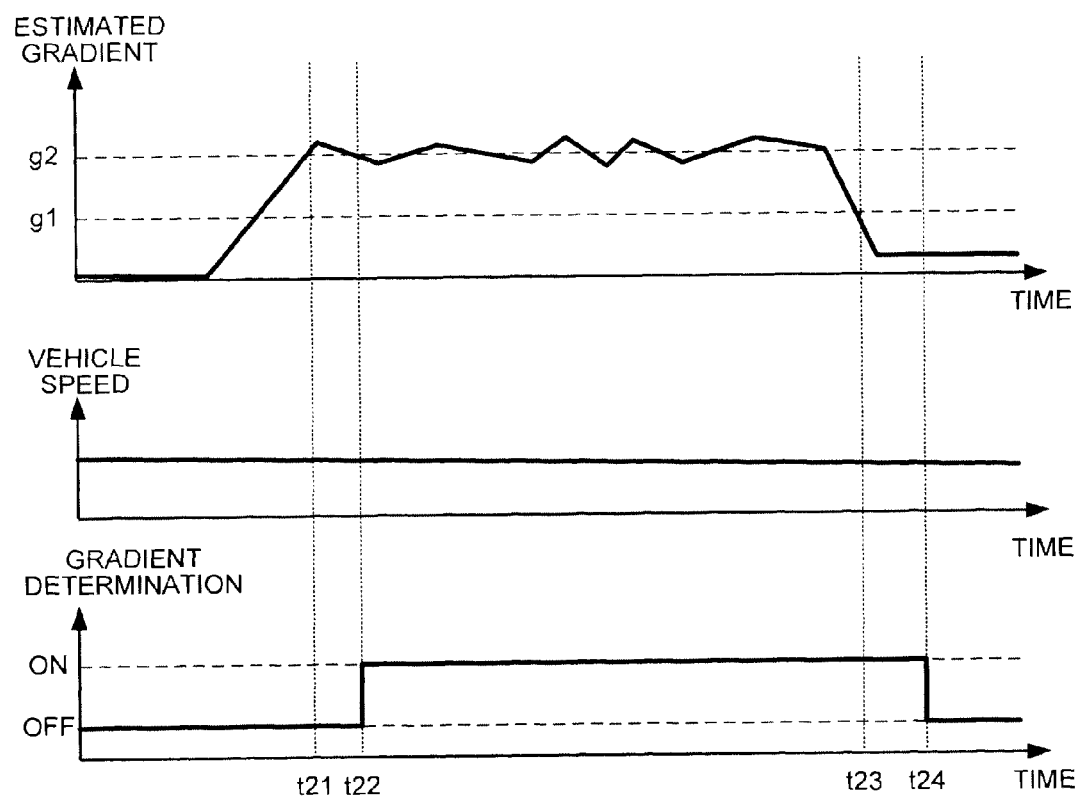
FIG. 14 is charts showing a control during traveling of the vehicle according to the embodiment of the present invention.

FIG. 14 is charts showing the control during the travel of the vehicle in the embodiment of the present invention.

In FIG. 14, the estimated gradient, the vehicle speed and the gradient determination state are respectively shown in the form of time charts from top with a horizontal axis representing time.

FIG. 14 shows a state where the estimated gradient exceeds the predetermined value g2 at timing t21 during the travel of the vehicle and, thereafter, becomes smaller than the gradient release determination threshold value g1 at timing t23.

At timing t21, the estimated gradient becomes equal to or smaller than the predetermined value g2. If this state continues for the first predetermined time (timing t22), the determination becomes affirmative in Step S21 of FIG. 11 described above and the gradient is determined.

Thereafter, the estimated gradient rises above and falls below the gradient determination threshold value g2 as the vehicle travels, but the gradient determination is not released just because the estimated gradient falls below g2 since the hysteresis for gradient determination is set.

Thereafter, at timing t23, the estimated gradient becomes smaller than the gradient release determination threshold value g1. If this state continues for the second predetermined time (timing t24), the determination becomes negative in Step S35 of FIG. 12 described above and the gradient determination is released.

As described above, the embodiment of the present invention is applied to the hybrid vehicle provided with the engine 1 and the motor generator 2 as the drive sources. The hybrid vehicle includes the road surface gradient estimation/computation unit 201 as the road surface gradient detection unit for detecting a road surface gradient based on the detection value of the G-sensor 10b. The hybrid vehicle includes the gradient determination control unit for determining that a road surface is a gradient road and holding that gradient determination result if the engine 1 is in the stopped state and the state where the road surface gradient is not smaller than the gradient determination threshold value (g2) continues for the first predetermined time or longer. The hybrid vehicle includes the engine start control unit for starting the engine 1 when the gradient determination result is held by the gradient determination control unit and a start permission condition of the engine 1 is satisfied. The hybrid vehicle includes a traveling state determination unit for determining whether the hybrid vehicle is in the traveling state or in the stopped state. These are configured by the integrated controller 20.

In such a configuration, the integrated controller 20 releases the hold of the gradient determination result to the effect that the road surface is the gradient road on the condition that the state where the road surface gradient is smaller than the gradient release determination threshold value g1 continues for the second predetermined time or longer if the vehicle is determined to be in the traveling state. The integrated controller 20 releases the hold of the gradient determination result on the condition that the road surface gradient becomes smaller than the gradient release determination threshold value g1 if the hybrid vehicle is determined to be in the stopped state.

By such a control, the start of the engine in a flat state is prevented such as when the road surface becomes flat simultaneously with the stop of the vehicle. For example, in such a road surface state where the vehicle stops after the gradient determination result is held and the road surface gradient disappears simultaneously with the stop of the vehicle, the hold of the gradient determination result can be released and the start of the engine can be suppressed. This can prevent a sense of incongruity from being given to the driver by the engine start and suppress fuel consumption. This can prevent a sense of incongruity from being given to the driver by preventing vibration and noise of the engine and suppress fuel consumption.

The gradient determination threshold value g2 for determining the gradient and the gradient release determination threshold value g1 for determining the release of the hold of the gradient determination result may be the same value (e.g. predetermined value g2).

Although the predetermined value g2 as the gradient determination threshold value is set at the value larger than the gradient release determination threshold value g1 for the gradient determination release by the hysteresis, the gradient determination is released based on the gradient determination threshold value g2 when the vehicle is stopped.

Since this can enlarge a region for the gradient determination release, the start of the engine is suppressed, a sense of incongruity is prevented from being given to the driver by preventing vibration and noise of the engine and fuel consumption can be suppressed.

On the other hand, the gradient of the road surface is determined if the state where the road surface gradient is larger than the gradient determination threshold value g2 continues for the first predetermined time or longer also when the vehicle is in the stopped state. As described above, since the road surface gradient does not change in the stopped state of the vehicle, the influence of noise of the detection signal of the G-sensor 10b and the sway of the vehicle body irrelevant to the road surface change and the like can be eliminated based on the first predetermined time.

This can suppress unintended start of the engine, prevent a sense of incongruity from being given to the driver by preventing vibration and noise of the engine and suppress fuel consumption.

Although the embodiment of the present invention has been described above, the above embodiment is only an illustration of one application example of the present invention and not intended to limit the technical scope of the present invention to the specific configuration of the above embodiment.

The present application claims a priority of Japanese Patent Application No. 2012-58956 filed with the Japan Patent Office on Mar. 15, 2012, all the contents of which are herein incorporated by reference.

Exclusive nature or features of the embodiments of this invention are claimed as follows.

The invention claimed is:

1. A control device for a hybrid vehicle, comprising:
   an engine and a motor as drive sources of a vehicle;
   a gradient detection unit adapted to detect a gradient of a road surface;
   a gradient determination control unit adapted to determine that a road surface is a gradient road and holding a gradient determination result if the engine is in a stopped state and a state where the road surface gradient detected by the gradient detection unit is not smaller than a gradient determination threshold value continues for a first predetermined time or longer;
   an engine start control unit adapted to issue an engine start request on the condition that the gradient determination result is held by the gradient determination control unit and suspending the start of the engine until a start permission condition of the engine is satisfied after the engine start request; and
   a traveling state determination unit adapted to determine whether the vehicle is in a traveling state or in the stopped state;
   wherein the gradient determination control unit releases the hold of the gradient determination result to the effect that the road surface is the gradient road, while the start of the engine is suspended, on the condition that:
   a state where the road surface gradient detected by the gradient detection unit is smaller than a gradient release determination threshold value continues for a second predetermined time or longer if the vehicle is determined to be in the traveling state by the traveling state determination unit; and
   the road surface gradient detected by the gradient detection unit becomes smaller than the gradient release determination threshold value if the vehicle is determined to be in the stopped state by the traveling state determination unit.

2. The control device for a hybrid vehicle according to claim 1, wherein:
   the gradient determination threshold value is set at a gradient larger than the gradient release determination threshold value; and the gradient determination control unit releases the hold of the gradient determination result when the road surface gradient detected by the gradient detection unit is smaller than the gradient determination threshold value if the vehicle is determined to be in the stopped state by the traveling state determination unit.

3. The control device for a hybrid vehicle according to claim 1, wherein:

the gradient determination control unit determines that the road surface is in a gradient state and holds a determination result when a state where the road surface detected by the gradient detection unit is larger than the gradient determination threshold value continues for the first predetermined time or longer regardless of whether the state determined by the traveling state determination unit is the traveling state or the stopped state.

4. A gradient determination method for a hybrid vehicle provided with an engine and a motor as drive sources, the hybrid vehicle including:

a gradient detection unit adapted to detect a gradient of a road surface;

a gradient determination control unit adapted to determine that a road surface is a gradient road and holding a gradient determination result if the engine is in a stopped state and a state where the road surface gradient detected by the gradient detection unit is not smaller than a gradient determination threshold value continues for a first predetermined time or longer;

an engine start control unit adapted to issue an engine start request on the condition that the gradient determination result is held by the gradient determination control unit and suspending the start of the engine until a start permission condition of the engine is satisfied after the engine start request; and a traveling state determination unit adapted to determine whether the vehicle is in a traveling state or in the stopped state;

wherein the gradient determination control unit:

releases the hold of the gradient determination result when a state where the road surface gradient detected by the gradient detection unit is smaller than a gradient release determination threshold value continues for a second predetermined time or longer if the vehicle is determined to be in the traveling state by the traveling state determination unit; and releases the hold of the gradient determination result when the road surface gradient detected by the gradient detection unit becomes smaller than the gradient release determination threshold value if the vehicle is determined to be in the stopped state by the traveling state determination unit while the start of the engine is suspended.

* * * * *